Aug. 16, 1932.   E. B. STIMPSON   1,872,564
SLOTTING MACHINE
Filed April 11, 1930    6 Sheets-Sheet 1

INVENTOR
Edwin B. Stimpson
BY George Ramsey
his ATTORNEY

Aug. 16, 1932.  E. B. STIMPSON  1,872,564
SLOTTING MACHINE
Filed April 11, 1930    6 Sheets-Sheet 4

Fig. 4.

INVENTOR
Edwin B. Stimpson
BY
George Ramsey
his ATTORNEY

Aug. 16, 1932.  E. B. STIMPSON  1,872,564
SLOTTING MACHINE
Filed April 11, 1930  6 Sheets-Sheet 5

INVENTOR
Edwin B. Stimpson
BY George Ramsey
his ATTORNEY

Aug. 16, 1932.  E. B. STIMPSON  1,872,564
SLOTTING MACHINE
Filed April 11, 1930   6 Sheets-Sheet 6

INVENTOR
Edwin B. Stimpson
BY George Ramsey
his ATTORNEY

Patented Aug. 16, 1932

1,872,564

UNITED STATES PATENT OFFICE

EDWIN B. STIMPSON, OF BROOKLYN, NEW YORK, ASSIGNOR TO EDWIN B. STIMPSON COMPANY, OF BROOKLYN, NEW YORK, A CORPORATION OF NEW YORK

SLOTTING MACHINE

Application filed April 11, 1930. Serial No. 443,277.

This invention relates to the slotting of blanks and will be disclosed in connection with a machine for cutting slots in rivet blanks to thereby make bifurcated rivets. The invention is, however, applicable to the slotting of blanks for other purposes.

Heretofore in the art, cut bifurcated rivets have usually been made by feeding rivet blanks successively into cutting position where they are slotted one at a time by a single rotating saw or cutter blade. There is a practical limit to the speed at which the saw-teeth can be satisfactorily forced through the rivet blank and this places a definite limit on the speed at which the machine can be driven. Attempts have been made to speed up production by using two successively operating saws or cutters so arranged that alternate rivets are slotted by one cutter and the intermediate rivets are slotted by the other cutter. See patent to Havener 1,588,576. These attempts have not been altogether satisfactory, among other reasons, because the mechanisms used have usually been expensive, complicated, and subject to breakdown. Furthermore, the maximum speed at which a machine of the type shown in the Havener patent can be driven is relatively low, because the rivet handling devices are of such a character that they require relatively large time intervals for satisfactory operation.

The general object of the present invention is to provide a method of and/or a machine for slotting blanks at a rate of speed higher than has heretofore been practicable.

Another object of the invention is to simplify and/or reduce the cost of manufacture of slotting machines capable of producing slotted blanks at a high rate of speed.

Another object of the invention is to provide a slotting machine capable of turning out an increased number of rivets per hour without subjecting the machine to liability of breakage and/or faulty operation.

Other objects of the invention will be obvious from the following disclosure.

The invention is disclosed in connection with an illustrative machine which operates as follows: Rivet blanks to be slotted are automatically fed to recesses in a conveyor of the endless belt type. This conveyor is advanced step-by-step; and at each period of rest or dwell of the conveyor, two new blanks are fed to the conveyor and two blanks carried by the conveyor are clamped for slotting and are slotted by a pair of cutter blades mounted side by side on a rotary cutter-head. At each advance of the conveyor two rivets which have previously been slotted are removed from the conveyor. The cutter-head is provided with two oppositely positioned pairs of cutter blades and the conveyor is advanced two steps for each rotation of the cutter-head. At each step the conveyor advances two rivets so that four rivets are slotted for each rotation of the cutter-head.

*General organization of the machine*

Reference will now be had to Figs. 1, 2, 3, and 4. The operating parts of the machine are supported by a frame 1 and a top plate 2. A main shaft 3 is journaled in the frame in any suitable manner that will prevent end play, and is provided with a cutter-head 4 that rotates in a cutter chamber 5. In actual operation the cutter chamber 5 is closed by a cover plate placed against the open side of the chamber shown in Fig. 2, but this plate has been omitted from the drawings to prevent confusion and to expose the cutter-head to view. The main shaft 3 may be driven from any suitable source of power as by belt driven pulley 6 (Fig. 2) from which motion is transmitted to the main shaft by reduction gears 7 and 8. The devices for feeding and clamping the rivets are supported by the top plate 2 and their operation is coordinated by cams 9 and 10 fixedly secured to the main shaft.

*Rivet handling mechanism*

The rivets are handled by an endless conveyor 11 mounted on driving pulley 12 and idler pulley 14. This conveyor may be made of any suitable material, thin spring steel having been used for the purpose. Driving pulley 12 is provided with driving pins 15 which engage conveyor recesses 16 and 17 to form a positive driving connection. The recesses 16 are adapted to receive the rivets to be conveyed; and the two sets of recesses 16 and 17 render the conveyor substantially symmetrical about its center line, thus preventing any tendency toward unequal expansion of the two edges of the conveyor. To keep the conveyor taut idler pulley 14 may have its shaft mounted on a slidable block 18 which is urged outwardly by a spring 19.

Attached in any suitable manner to driving pulley 12 is a special form of worm gear 13 adapted to be intermittently driven by mutilated worm cam or spiral gear 10 carried by the main shaft 3. The worm cam 10 has four sections of thread, 20, 21, 22, and 23. The thread sections 20 and 21 are advancing sections which engage alternate pairs of tooth surfaces 24 and serve to advance the worm gear 13. Thread sections 22 and 23 are non-advancing sections which engage the intermediate pairs of tooth surfaces 25 and serve to hold the worm gear 13 stationary. It is thus apparent that as worm cam 10 rotates, the gear 13 and the conveyor 11 will be advanced step-by-step, i. e., the conveyor will have short periods of motion separated by periods of dwell. In order to keep gear 13 under constant control, thread 22 engages it before thread 20 leaves it, and similarly for threads 23 and 21. The tips of the thread sections are suitably relieved to prevent binding during these transition periods.

At each dwell of the conveyor a pair of rivet receiving recesses 16 are in alignment with gravity chutes 26 and 27, and rivet blanks descend under the action of gravity and enter the recesses. Each step of movement of the conveyor is equal to twice the distance between adjacent recesses 16 and hence the conveyor receives two rivets for each step of movement. The chutes 26 and 27 may be fed from any suitable hopper mechanism which mechanically arrange the rivets for delivery to a chute. Many such mechanisms are known to the art, and hence are not herein disclosed.

*Rivet clamping mechanism*

Figure 9:
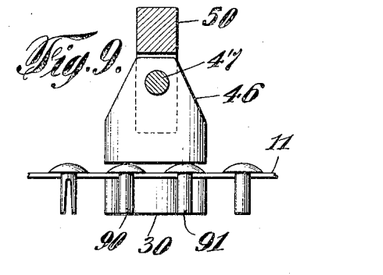
Fig. 9 is a detail view showing primarily the clamping of the heads of the rivets at the slotting station.
Figure 10:
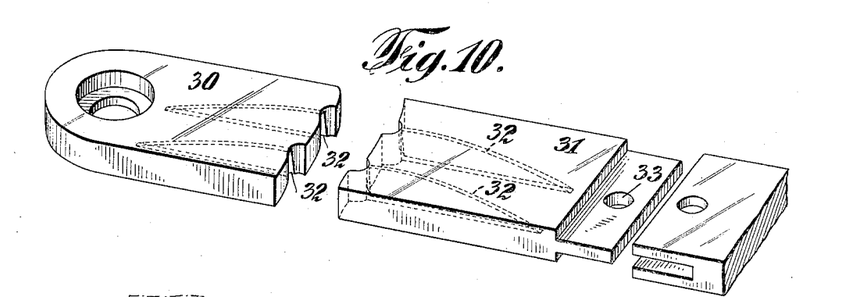
Fig. 10 is a perspective view showing the dies or clamps for clamping the shanks of the rivets at the slotting station.
Figure 11:
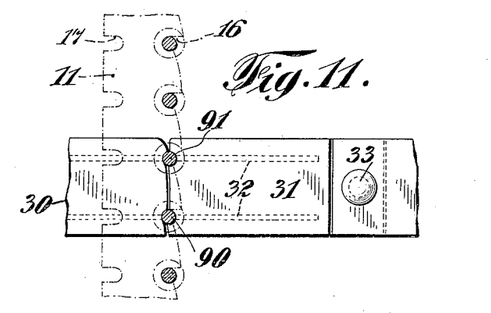
Fig. 11 is a detail plan view showing the clamping of the shanks of the rivets at the slotting station.

At each dwell of the conveyor two rivet blanks carried by the conveyor are clamped for slotting. The shanks are clamped by two opposed dies 30 and 31 (Fig. 10) which are positioned transversely of the main shaft 3 and which clamp the shanks of the rivets beneath the edge of conveyor 11, as shown in Figs. 9 and 11. The dies 30 and 31 are provided with arcuate slots 32 through which the saws pass to slot the shanks of the rivets. The die 31 is a reciprocating slide and its clamping end is pivoted at 33 to permit a slight sidewise swing which facilitates firm clamping of the two rivets in cases where the shank of one rivet to be clamped is slightly larger than the shank of the other rivet to be clamped. Preferably this pivotal connection is sufficiently loose to permit slight vertical tipping of the end of the slide 31 to enable it to conform to rivet shanks which may be slightly tapered.

In the form of the invention shown, the die 30 is stationary; and the die 31 is urged into clamping position by a strong spring 40, but die 31 is held out of clamping position at times by cam 9 carried by shaft 3. When the cam 9 comes to position shown in Fig. 2 it allows cam lever 44 to descend, thereby permitting motion of lever 45 to release the die 31 and permit it to be moved into clamping position by spring 40. When the slotting of the clamping rivets has been completed, cam 9 will rock cam lever 44 in a counter-clockwise direction (Fig. 2), thus causing lever 45 to withdraw the slide 31 to non-clamping position. In some cases it is desirable for dies 30 and 31 to both be movable as shown in my copending application Serial Number 414,637, filed December 17, 1929.

Figure 1:
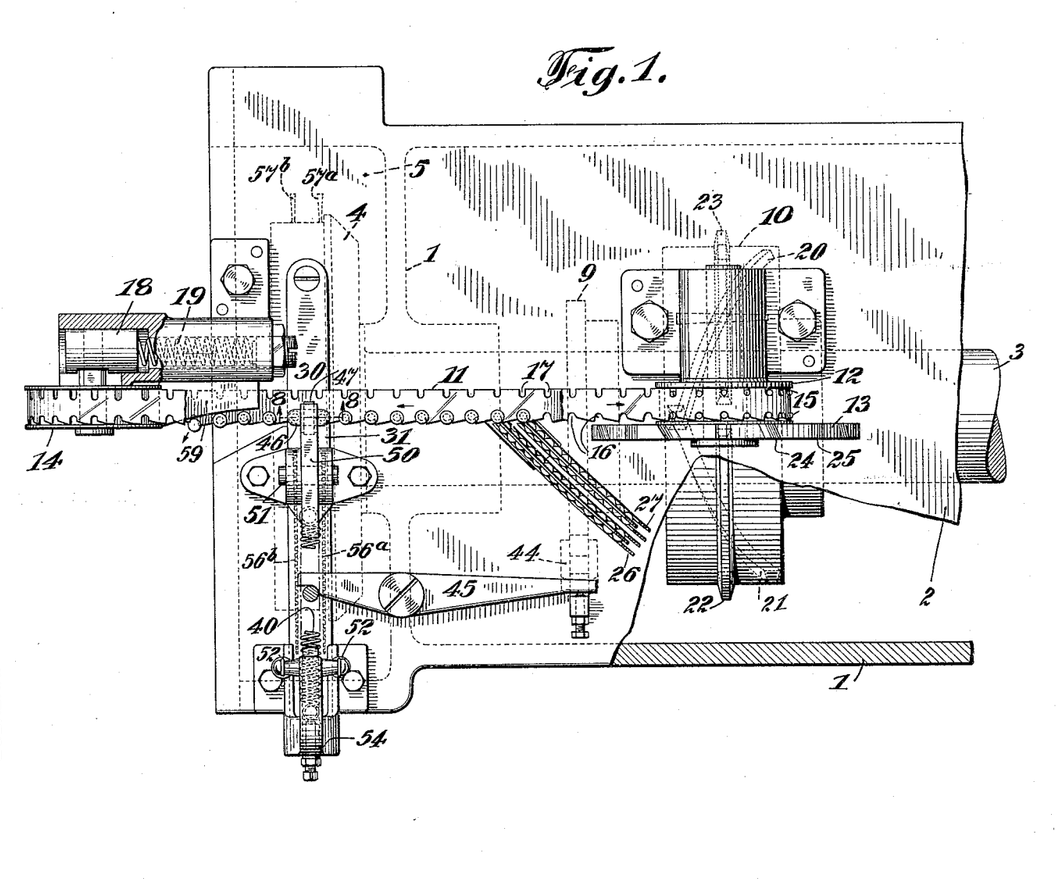
Fig. 1 is a fragmentary plan view of the machine with one of the parts in section and other parts broken away.
Figures 2, 8:
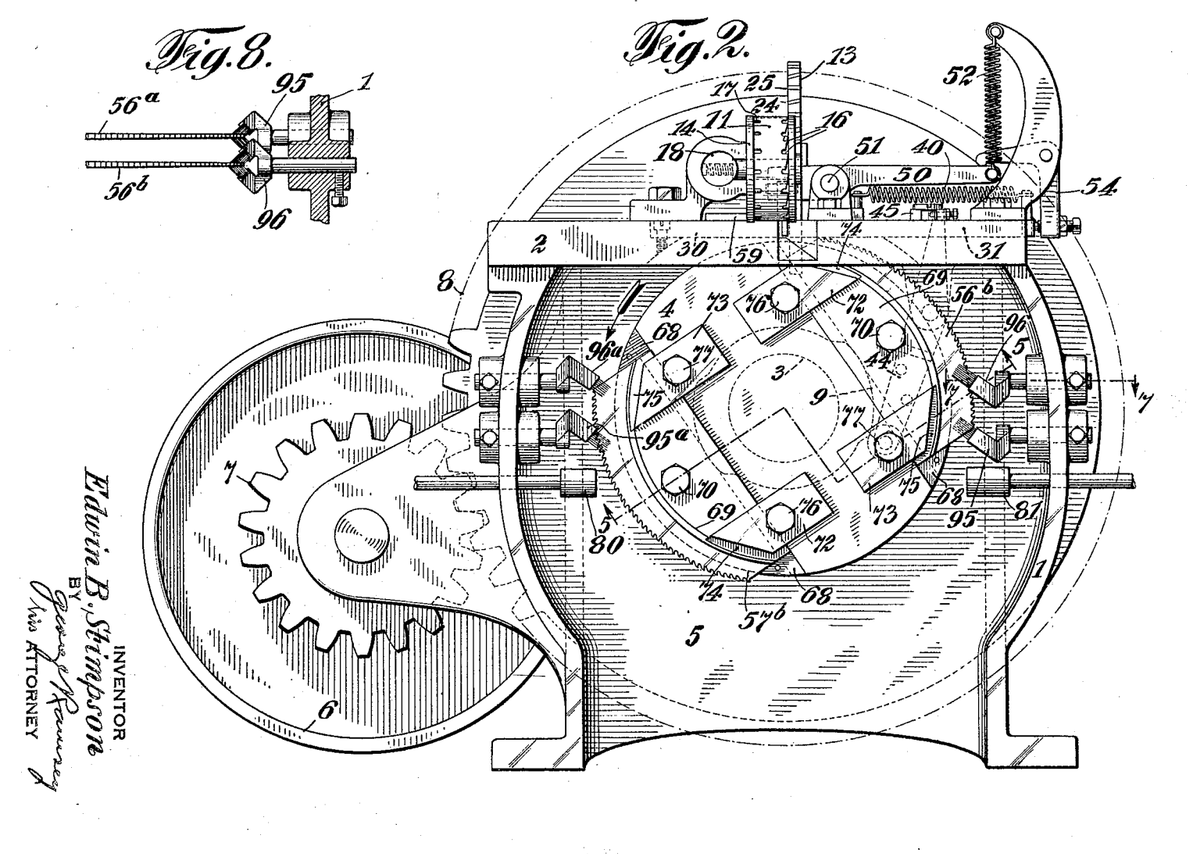
Fig. 2 is an end elevation of the machine with the cover plate for the cutter chamber removed.
Fig. 8 is a detail view showing brushes for removing chips from the cutter blades.
Figure 3:
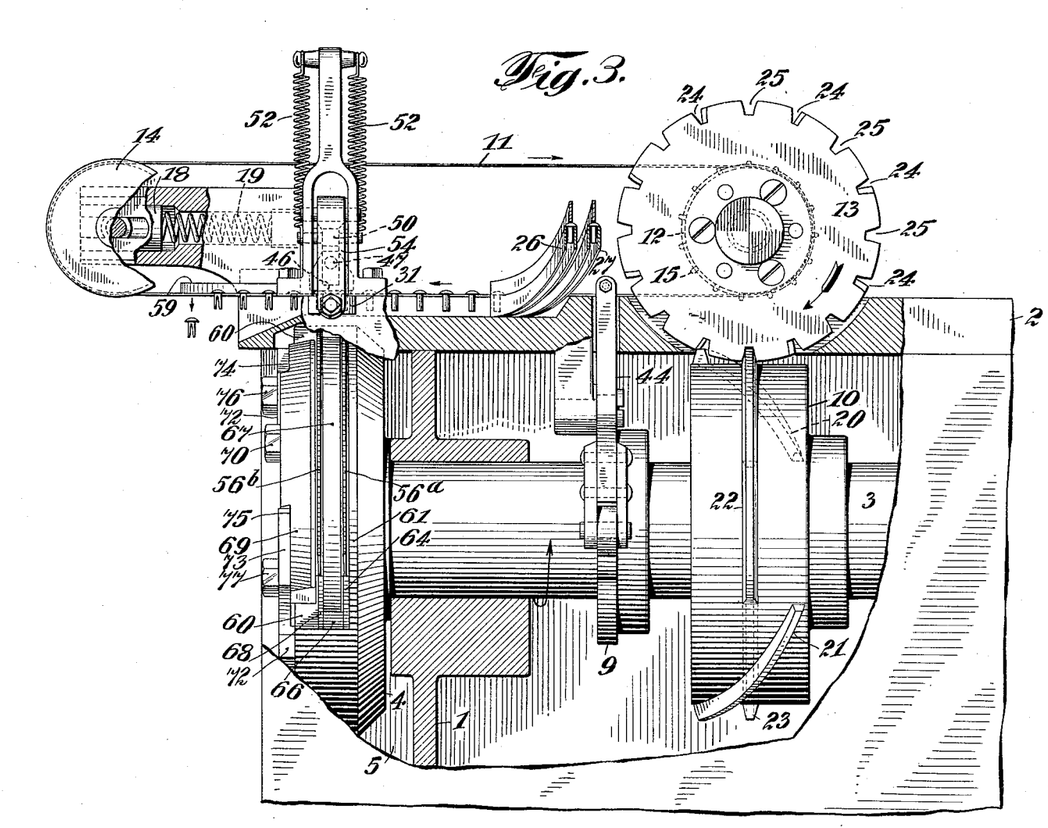
Fig. 3 is a fragmentary side elevation of the machine with certain parts in section and certain other parts broken away.
Figure 4:
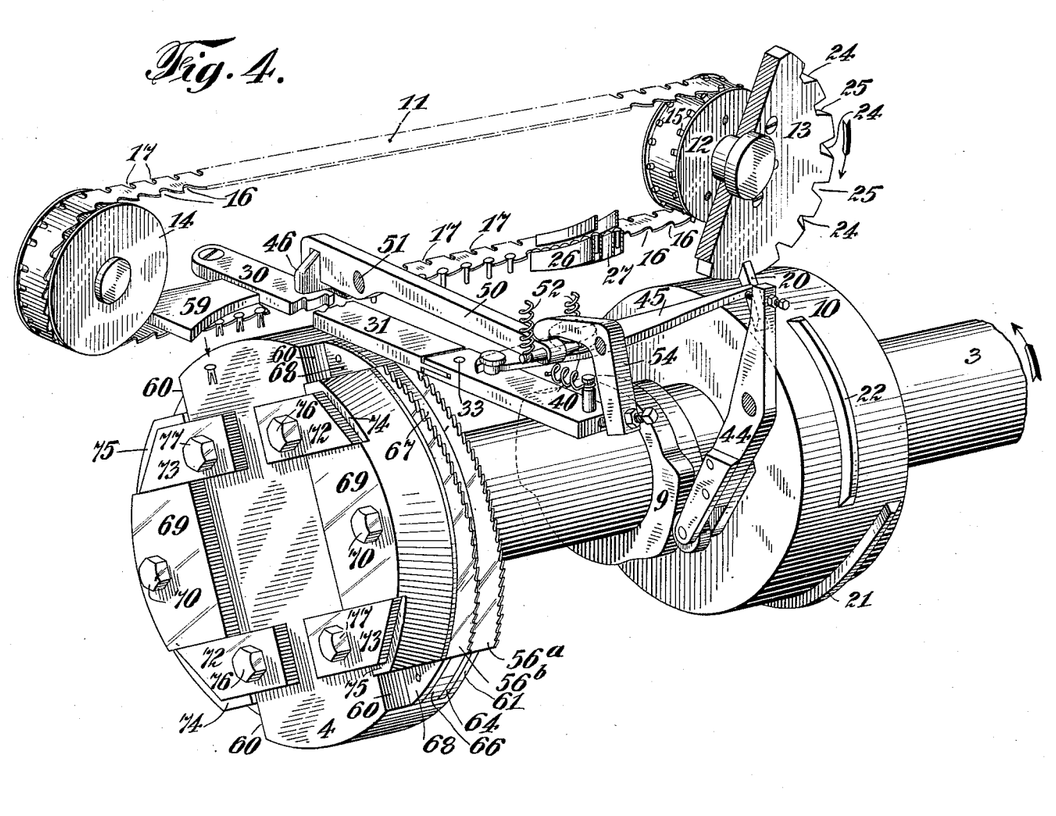
Fig. 4 is a diagrammatic perspective view showing the principal operating parts of the machine.

The heads of the rivets are clamped by clamp block 46 (see Figs. 4 and 9) pivoted at 47 to the end of a lever 50. Lever 50 is pivotally mounted at 51 and biased by strong springs 52, Figs. 2, 3, and 4 to urge it into clamping position. However, the lever 50 is normally held in non-clamping position by bell crank lever 54 (Figs. 2 and 4), the horizontal arm of which engages the top of lever 50 and the vertical arm of which makes adjustable engagement with the end of slide 31, as shown in Figs. 2 and 4. When slide 31 moves in to clamp the shanks of the rivets, bell crank lever 54 rocks in a clockwise direction (Fig. 2), thus permitting springs 52 to elevate the outer end of lever 50 and press the clamp block 46 (Fig. 9) against the heads of the rivets. After the rivets have been slotted, clamp slide 31 is moved outwardly under the control of cam 9 and this outward motion imparts counter-clockwise movement to bell crank lever 54, thus withdrawing clamp block 46 from the heads of the rivets.

As the rivets advance after being slotted, their heads engage a stationary cam 59 (Figs. 3 and 4) which pushes the rivets from the conveyor 11 and permits them to fall into a discharge chute (not shown).

*Cutter-head and cutter blades*

Figure 5:
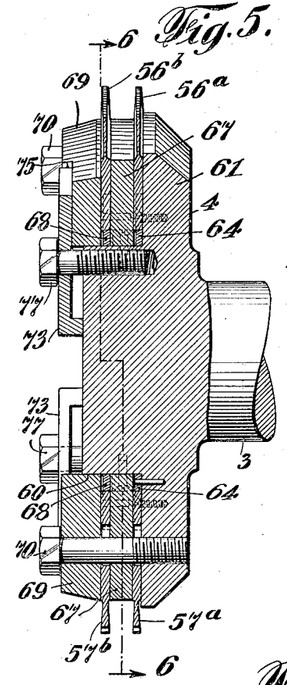
Fig. 5 is a vertical section of the cutter-head taken on line 5—5 of Fig. 6.
Figure 6:
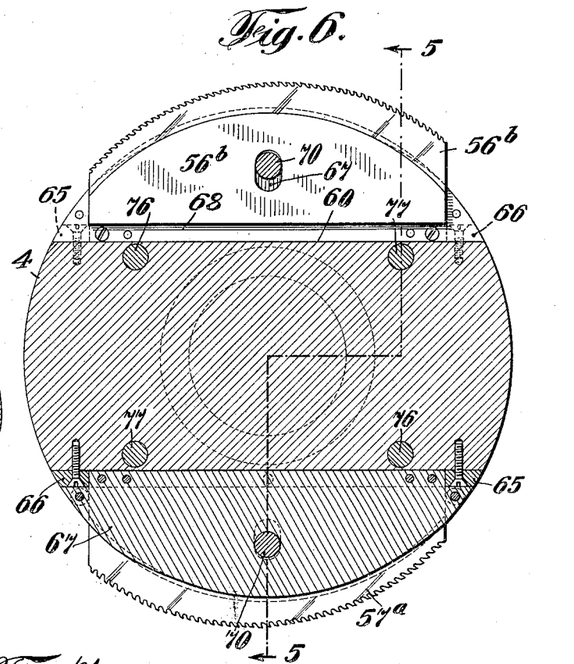
Fig. 6 is a vertical section of the cutter-head taken on line 6—6 of Fig. 5.
Figure 7:
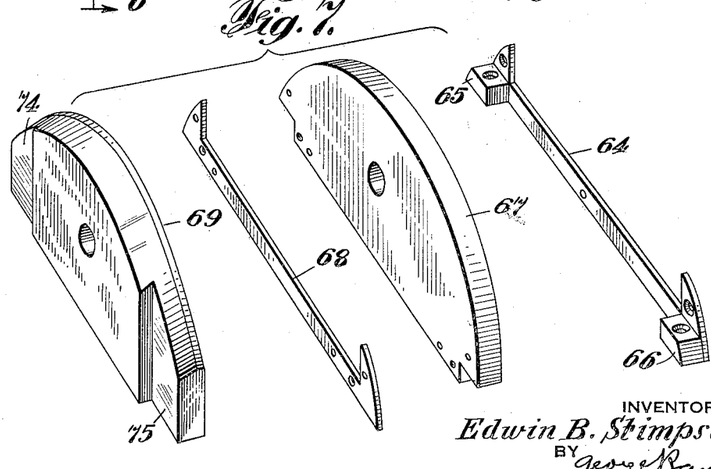
Fig. 7 is a perspective view showing parts for mounting the cutter blades.

The mechanical construction of the cutter-head and cutters is best shown in Figs. 5, 6, and 7. One end of the main shaft 3 carries a cutter-head 4 which is preferably forged integral with the main shaft. The cutter-head is adapted to carry two pairs of cutter blades, the blades of each pair being mounted side by side, and the two pairs being positioned diametrically opposite on the cutter-head. The construction and mounting of the two pairs of cutter blades are the same and hence only one pair will be described in detail.

A segmental section is cut from the cutter-head in such manner as to produce a chordal base 60 and a segmental back portion 61. Secured in any suitable manner (as by screws and dowels) to the back portion 61 is a blade locating plate 64 which receives the bottom of cutter blade 56ª and serves to locate it on the cutter-head. Adjacent the ends of locating plate 64 are blocks 65 and 66 which may be permanently screwed to base 60 and so spaced as to serve to locate spacer block 67. Spacer block 67 has permanently attached to its outer side a second locating plate 68. After cutter blade 56ª has been inserted in locating plate 64, spacer block 67 is set in place against blade 56ª with its base portion located between blocks 65 and 66. Then cutter blade 56ᵇ is set in place in locating plate 68 and clamp block 69 is placed against cutter blade 56ᵇ. Clamp block 69 may be held in place by one bolt and two clamps. Bolt 70 passes through block 69, blade 56ᵇ, block 67, and blade 56ª, and is threaded into back portion 61. Clamps 72 and 73 bear against clamping surfaces 74 and 75, respectively, and are secured by bolts 76 and 77 respectively. These bolts may be threaded directly into the metal of the cutter head 4.

Figure 12:
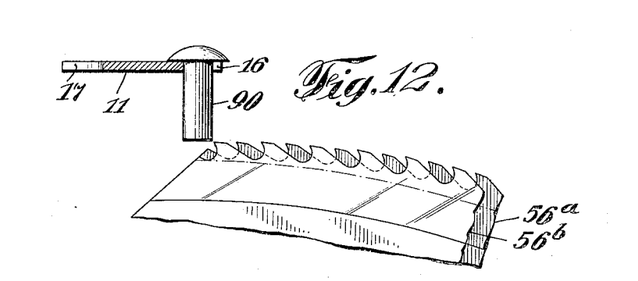
Fig. 12 is a vertical section detail view showing the preferred arrangement of the cutter teeth.
Figure 13:
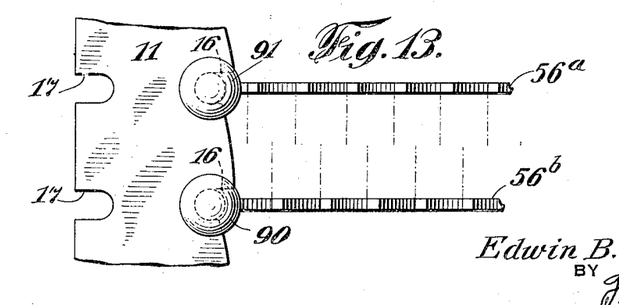
Fig. 13 is a plan detail view also showing the preferred arrangement of the cutter teeth.

The cutter blades of each pair may be so arranged that respective teeth in the two blades are in alignment, but preferably the blades are so arranged that the teeth are staggered, as shown in Figs. 12 and 13. By this arrangement chips are cut alternately from rivets of a pair of clamped rivets 90 and 91, thus minimizing vibration from the cutting operation. This staggered arrangement of the teeth of the cutter blades can be produced by having the teeth on one blade cut slightly in advance of the teeth on the other blade of that pair. However, it is usually preferable to manufacture the blades as duplicates and produce the staggering of the teeth by so arranging the seats in locating plates 64 and 68 that one cutter blade is mounted slightly in advance of the other, rotatably speaking.

It will be seen that the cutter head 4 may be considered as divided into four zones. Two of the zones are provided with cutter blades and may therefore be conveniently referred to as "cutting zones." The other two zones of the cutter head have no cutting blades and may therefore be referred to as idle zones. Each cutting zone has a plurality of cutter blades and there are a plurality of cutting zones on the cutter head. Accordingly each cutting zone serves to cut a "set" of blanks and a plurality of such sets of blanks are cut during each revolution of the cutter head. In the form of the invention disclosed the "set" of blanks is two blanks, but the invention contemplates operating on "sets" of more than two blanks, and contemplates cutting more than two sets of blanks per revolution of the cutter head. Where shallow slots are to be cut, short cutting blades may be used, thus permitting the use of more than two cutting zones on the cutter head.

*Removal of chips from the cutters*

In actual practice the cutters are lubricated by lubricant forced to spray nozzles 80 and 81 by any suitable pump (not shown). In addition to lubricating cutters the streams of lubricant wash away the chips, but it is desirable to provide mechanical means to insure as complete removal of the chips as possible. As shown in Figs. 2 and 8, there are provided two pairs of opposed wire brushes 95 and 96, one pair engaging the sides of cutter blades 56ª and 57ª, and the other pair engaging the sides of cutter blades 56ᵇ and 57ᵇ. If desired, an additional pair of similar wire brushes 95ª and 96ª may be provided, as shown in Fig. 2.

It is realized that the invention may be embodied in, and carried out by, mechanisms other than those particularly disclosed, and hence the present disclosure is merely illustrative in compliance with the patent statutes and is not to be considered as limiting.

Having described my invention, I claim:

1. A slotting machine comprising a conveyor of the endless type operable to move rivet blanks in a rectilinear path, said conveyor having a series of blank receiving recesses; means to drive said conveyor step-by-step; means to feed at least one blank to a recess during each period of dwell of the conveyor; means independent of the conveyor to clamp the blanks during slotting; and means operable during each period of dwell of the conveyor to slot at least one of the blanks carried thereby, said slotting means moving in a plane transverse to the rectilinear path of said blanks.

2. A slotting machine comprising a conveyor of the endless belt type, said conveyor being a single continuous flexible member and having a series of blank receiving spaces in one side thereof; means to drive said conveyor step-by-step; means to feed blanks to said blank receiving spaces; means independent of said conveyor to clamp said blanks during slotting; and means operable during each period of dwell of the conveyor to slot at least one of the blanks carried thereby, said slotting means moving in a plane transverse to said conveyor.

3. A slotting machine comprising a conveyor of the endless belt type operable to convey blanks in a single plane, said conveyor having a series of blank receiving spaces; means to drive said conveyor step-by-step; means to feed blanks to said blank receiving spaces; means independent of said conveyor to clamp said blanks during slotting; and means operable during each period of dwell of the conveyor to simultaneously slot a plurality of the blanks carried thereby.

4. A slotting machine comprising a main shaft; means establishing a slotting station; a conveyor for conveying blanks to the slotting station, said conveyor being driven from said shaft; movable clamping means independent of said conveyor and operable by said shaft for clamping blanks at the slotting station; and means carried by said main shaft for slotting the blanks.

5. A slotting machine comprising a conveyor of the endless belt type having a series of blank receiving recesses; means to feed blanks to said recesses; means to simultaneously clamp a plurality of blanks carried by said conveyor, said clamping means holding the blanks independently of said conveyor; and means to cut slots in the clamped blanks.

6. A slotting machine comprising a main shaft, means to feed blanks to a slotting station, means carried by said main shaft to control the operation of said blank feeding means, movable blank holding means operable to hold blanks independently of the conveyor at the slotting station, means carried by the shaft to control the operation of said blank holding means, and cutter means carried by the main shaft to slot the held blanks.

7. A slotting machine comprising a main shaft, means to feed blanks to a slotting station, cam means carried by said main shaft to control the operation of said blank feeding means, movable blank clamping means operable independently of the conveyor to clamp blanks at the slotting station, cam means carried by the main shaft to control the operation of said blank clamping means, and cutter means carried by the main shaft to slot the clamped blanks.

8. A slotting machine comprising a main shaft, a movable conveyor operable to carry blanks to a slotting station, means operable by the main shaft to give motion to the movable conveyor, means to feed blanks to the conveyor, spring pressed means operable independently of the conveyor to clamp blanks at the slotting station, cam means carried by the main shaft to control the operation of said spring pressed clamping means, and rotary cutter means carried by the main shaft to slot the clamped blanks.

9. A machine for slotting blanks comprising a conveyor of the endless belt type; means to feed blanks to said conveyor; means to clamp the blanks carried by the conveyor, independently of the conveyor and without removing them therefrom; means to slot the clamped blanks; and means to remove the slotted blanks from said conveyor.

10. A machine for slotting blanks comprising means establishing a slotting station; a rotary cutter head having a plurality of cutter zones and a plurality of idle zones; a plurality of cutters mounted in each cutter zone; and means to move blanks to slotting position along a path generally transverse to the plane of the cutters, said means being operable in timed relation with said cutter head to advance a plurality of groups of blanks to said slotting station during a single rotation of the cutter head, whereby a plurality of groups of blanks are slotted successively during each rotation of the cutter head.

11. A machine for slotting blanks comprising means establishing a slotting station for receiving a set of blanks arranged side by side; a rotary cutter head having a plurality of cutter zones and a plurality of idle zones; a plurality of cutters mounted side by side in each cutter zone on said cutter head; and means operable in timed relation with said cutter head to advance a plurality of groups of blanks to said slotting station during a single rotation of the cutter head whereby a plurality of groups of blanks are slotted successively during each rotation of the cutter head, the advance of blanks to the slotting station taking place during the passage of the idle zones of the cutter head.

12. A machine for slotting blanks comprising a rotary cutter head having a plurality of cutting zones and a plurality of idle zones, a plurality of cutter blades mounted side-by-side on the cutter head in each cutting zone, rivet feeding means comprising a flexible steel band with rivet receiving pockets therein, rivet holding means operable to hold a plurality of rivets side-by-side for simultaneous slotting by the respective cutter blades in a cutting zone of the cutter head, means operable during the passage of each idle zone to advance a plurality of rivets to said holding means having a pivoted head for simultaneous slotting by the blades in the succeeding cutting zone of the cutter head, and an ejector member to remove slotted rivets from said band.

13. A machine for slotting blanks comprising a rotary cutter head having a pair of cutting zones and a pair of idle zones, a pair of cutter blades mounted side-by-side in each cutting zone, rivet holding means having a pivoted head operable to hold a pair of rivets side-by-side for simultaneous slotting by the respective cutter blades in a cutting zone of the cutter head, and means operable during the passage of each idle zone to advance a pair of rivets to said holding means for simultaneous slotting by the blades in the succeeding cutting zone of the cutter head.

EDWIN B. STIMPSON.